(12) United States Patent
Jensen

(10) Patent No.: US 6,488,437 B1
(45) Date of Patent: Dec. 3, 2002

(54) ANCHOR PLATE

(76) Inventor: Emery Jensen, 303 First Ave. E., Washburn, WI (US) 54891

( * ) Notice: Subject to any disclaimer, the term of this patent is extended or adjusted under 35 U.S.C. 154(b) by 23 days.

(21) Appl. No.: 09/659,810

(22) Filed: Sep. 11, 2000

(51) Int. Cl.⁷ .................................................. F16D 1/00
(52) U.S. Cl. ............................ 403/283; 52/712; 52/698
(58) Field of Search ........................... 403/283; 52/712, 52/498

(56) References Cited

U.S. PATENT DOCUMENTS

| | | | |
|---|---|---|---|
| 2,218,426 A | 10/1940 | Huelbert, Jr. ................. | 72/115 |
| 2,606,350 A | 8/1952 | Fuench ......................... | 24/126 |
| 3,514,528 A * | 5/1970 | Ray ........................ | 403/283 X |
| 3,667,337 A | 6/1972 | Buche ........................... | 85/13 |
| 3,736,714 A | 6/1973 | Bluener ....................... | 52/300 |
| 3,899,803 A | 8/1975 | Blumlik ....................... | 24/204 |
| 4,508,319 A | 4/1985 | Tappan et al. ................. | 256/19 |
| 4,716,632 A | 1/1988 | Pecl ............................. | 24/289 |
| 4,784,509 A * | 11/1988 | Gozzano ................. | 403/283 X |
| 5,201,598 A * | 4/1993 | Tehan ..................... | 403/283 X |
| 5,794,334 A | 8/1998 | Chadbourne et al. ......... | 29/876 |

* cited by examiner

Primary Examiner—Lynne H. Browne
Assistant Examiner—John R. Cottingham
(74) Attorney, Agent, or Firm—Clifford A. Poff

(57) ABSTRACT

An anchor for an elongated structural member comprising sidewalls rigidly affixed in a spaced apart and confronting relation to a generally planar base for defining a channel to receive and secure the structural member to the planar base. The sidewalls have diverging sidewall surfaces from apexes from which the spaced and parallel sidewall surfaces extend in opposite directions along the planar base and support at least one prong to secure the planar base by the parallel sidewall surfaces. The prong is operatively positioned by upon rotational movement of the diverging sidewall surfaces to adjacent opposite sides of such a structural member.

8 Claims, 1 Drawing Sheet

ANCHOR PLATE

BACKGROUND OF THE INVENTION

In the construction arts there are known a wide variety of connector elements which are used to anchor structural members with respect to one another. Although available in many configurations for a variety of specialized purposes, perhaps the most common such connector element is the so-called plate nail or gang nail device. This typically is an essentially flat, usually rectangular metal plate having a number of die punched, integrally formed nail prongs extending transversely to one side of the plate. Such gang nail plates are commonly used, for example, in the construction of wood trusses for residential construction. Two such devices are disclosed in U.S. Pat. Nos. 3,667,337 and 3,899,803.

Among other specialized devices for use in construction are those disclosed in U.S. Pat. Nos. 2,218,426, 3,736,714, 2,606,350, 5,794,334, 4,508,319, 4,716,632. The first two of these patents disclose systems in which members are engaged by relative rotation of one member with respect to another.

BRIEF SUMMARY OF THE INVENTION

The present invention pertains to an anchor device for anchoring thereof with respect to a structural member. In its preferred form, the invention comprises a rigid, circular, plate-like base member having fixed to one side thereof a generally radially extending channel formed by a pair of transversely extending, upstanding sidewalls. Each of the sidewalls forms an angle having its apex located adjacent to the center of the base member such that the confronting sidewalls diverge from one another, from their respective apexes toward the outer perimeter of the base member.

The channel formed between the two spaced sidewalls is wide enough to receive an elongated structural member, a 2×4 stud for example, and the diverging sidewalls provide freedom to rotate the anchor apparatus with respect to the structural member, within the limits defined by the sidewalls. At least one of the sidewalls includes nail prong elements extending therefrom into the channel formed between the sidewalls such that, in one rotational position of a structural member received therein, the prongs penetrate the structural member to anchor the novel anchor to the structural member.

The disclosed anchor device provides for improved efficiency and ease of use and can offer enhanced structural integrity for the structures in which it is used.

It is therefore one object of the invention to provide a novel and improved structural anchor device.

Another object of the invention is to provide a structural anchor device which is engaged with a structural member by rotation of the anchor device with respect to the structural member.

Figure 1:
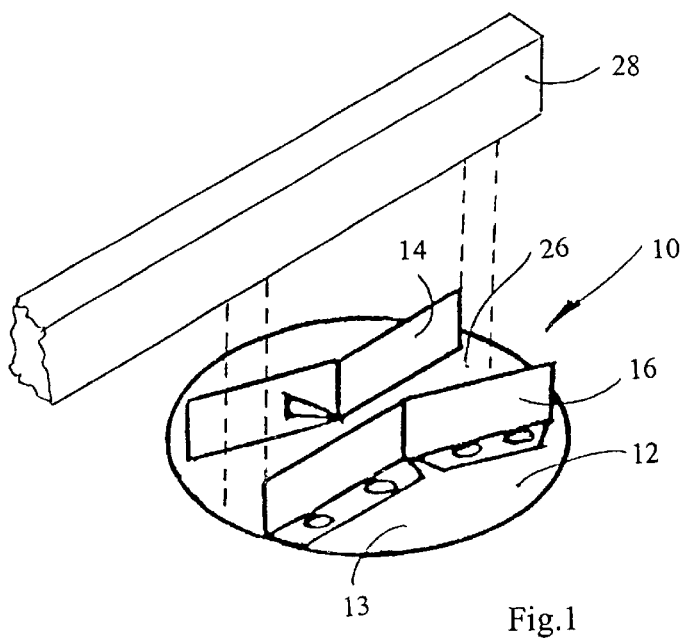
Figure 2:
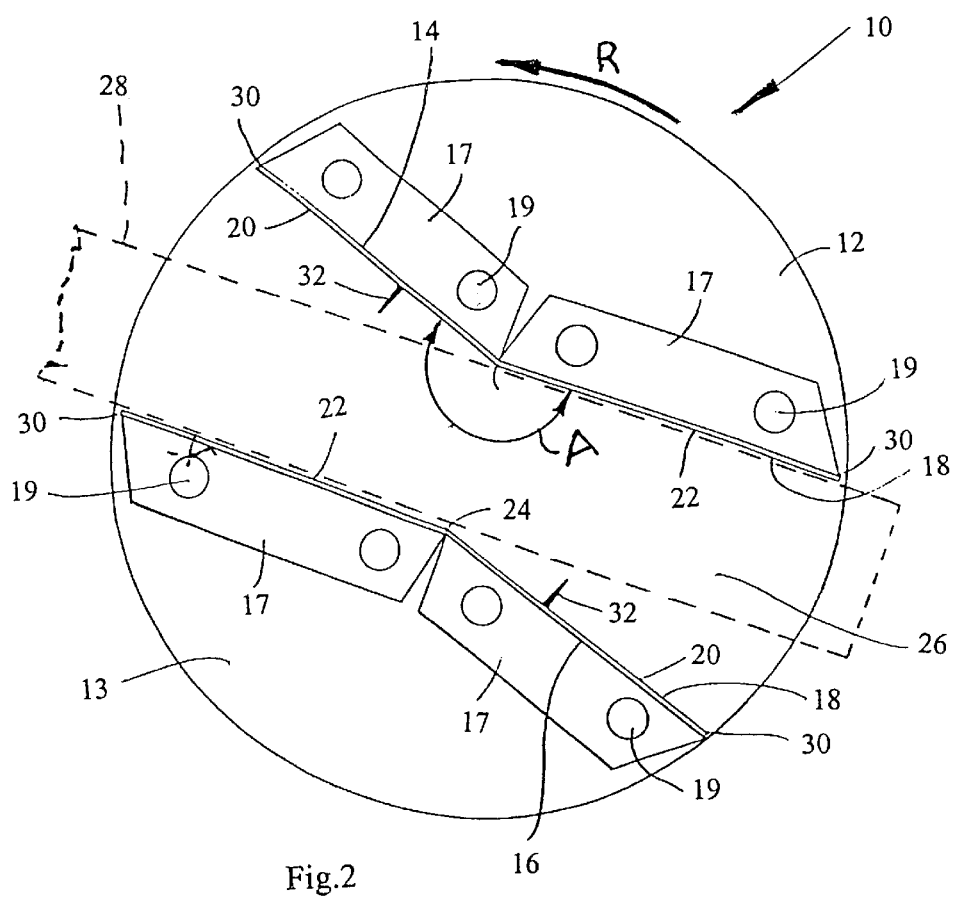

These and other objects and further advantages of the invention will be more fully understood upon consideration of the following detailed description and the accompanying drawings, in which FIG. 1 is a perspective view of an anchor apparatus of the present invention; and FIG. 2 is a top plan view of the apparatus of FIG. 1.

DESCRIPTION OF THE PREFERRED EMBODIMENT

There is generally indicated at 10 in FIGS. 1 and 2 an anchor apparatus according to one presently preferred embodiment of the invention. Anchor 10 comprises a generally planar, rigid base plate 12 of steel, for example, with a pair of upstanding abutments in the form of angled sidewalls 14, 16 fixed to a surface 13 thereof Sidewalls 14 and 16 are disposed to confront each other, and each has an elongated, angled surface 18 comprised of surface portions 20 and 22 which meet at an apex 24 to form an angle A greater than 180 degrees. Sidewalls 14, 16 may be formed from angle stock, for example, to provide flange portions 17 by which the sidewalls 14, 16 may be fixed to base plate 12 by such suitable means as spot welds 19, for example.

The sidewalls 14 and 16 are positioned with surfaces 18 spaced transversely apart and with each surface portion 20 and 22 extending generally parallel to a diameter of the base plate 12, thereby forming a channel 26 having a varying width that is narrowest at the apexes 24 and widest at the respective outermost ends 30 of the sidewalls 14 and 16. At all locations the channel 26 is wide enough to receive therein an elongated structural member such as a 2×4 stud 28, shown in FIG. 2 in its initial position. Moreover, the divergence of the respective, confronting sidewall surface portions 20 and 22 allows space for the anchor 10 to be rotated with respect to member 28 between extreme positions, one being the position with member 28 adjacent to surfaces 22 as shown in FIG. 2, and the other being a position with member 28 adjacent to surfaces 20.

Each of surface portions 20 includes one or more nail prongs 32 which project transversely therefrom into the space between sidewalls 14, 16, for selective penetration into member 28 as described hereinbelow. The Length of the nail prongs 32 is to be sufficient to ensure structural integrity in the attachment created by penetration of the prongs 32 into structural member 28, but also short enough that they provide sufficient clearance for initial placement of the structural member 28 in channel 26 as shown in FIG. 2.

In use, the anchor 10 is positioned with the portion of its surface 13 between sidewalls 14 and 16 in engagement with a structural member, the narrow side of a 2×4 stud for example, and with sidewall surface portions 22 abutting the 2×4 stud as shown in FIG. 2. By then rotating the anchor 10 in the direction of arrow R, the sidewall portions 20 are brought into abutting engagement with the 2×4 stud, with nail prongs 32 penetrating the 2×4 stud and securing the anchor 10 to it. The base plate 12 thus is anchored with respect to the 2×4 stud and may be used to secure the stud to other structural elements in a variety of ways. For example:

- base plate 12 may be provided with through openings to receive nails, screws or bolts, or it may be die punched to provide formed nail prongs as in a plate nail device, for fastening thereof to a structural member.
- a second anchoring structure, similar to that described hereinabove, may be provided on the opposite side of base plate 12 for attachment to another structural member.

Any suitable, known anchoring or attachment structure may be fixed to the opposed side of base plate 12.

The invention is also amenable to a variety of other modifications and alternative embodiments. for example:

- suitable gussets may be provided to strengthen the upstanding sidewalls 14, 16;
- the entire apparatus may be die punched and formed from a single piece of stock rather than welded up from individual components;
- the pair of nail prongs 32 may instead be a multiplicity of prongs on each sidewall surface portion 20;

a wedge or similar lock element may be provided for insertion into channel 26 between stud 28 and the sidewall surface portions 22 to prevent disengagement of the stud 28 from nail prongs 32;

base plate 12 may be other than circular in shape;

base plate 12 may be provided with a perimeter notch or similar structure which is engageable by a lever tool to aid in rotation of the apparatus for engagement on stud 28;

the entire apparatus may be configured for attachment to a structural member with section dimensions other that those of a 2×4 stud.

All of the above modifications may be used in suitable combinations, as deemed appropriate to the intended application or use of the anchor apparatus.

I have envisioned and anticipated these and other embodiments and modifications, and certainly such would also occur to others versed in the art once they were apprised of the invention. Accordingly, it is my intention that the invention should be construed broadly and limited only by the scope of the claims appended hereto.

I claim:

1. An anchor apparatus for an elongated structural member, said anchor apparatus comprising sidewalls rigidly affixed in a spaced apart and confronting relation to a generally planar base for defining a channel to receive and secure a structural member to said planar base, said sidewalls including diverging sidewall surfaces from apexes from which spaced and parallel sidewall surfaces extend in opposite directions along said planar base and support at least one prong to secure said planar base by said parallel sidewall surfaces, said prong being operatively positioned by rotational movement by said diverging sidewalls to adjacent opposite sides of such a structural member and thereby selective penetration of the prong with the structural member residing in said channel.

2. The anchor apparatus according to claim 1 wherein said diverging sidewall surfaces comprise angled sidewall surfaces extending from said apexes to form an angle greater than 180 degrees with adjoining ones of said spaced and parallel sidewall surfaces, said angled sidewall surfaces moving out of contact with the structural member upon said rotational movement.

3. The anchor apparatus according to claim 2 wherein said angled sidewall surfaces are spaced and extend parallel from the respective ones of said apexes in opposite directions.

4. The anchor apparatus as set forth in claim 1 wherein said generally planar base is a generally circular planar member.

5. The anchor apparatus as set forth in claim 2 wherein said prong includes nail prongs extending from each of said spaced and parallel wall surfaces toward an opposing one of said angled sidewall surfaces.

6. The anchor apparatus as set forth in claim 1 wherein each of said sidewalls includes a pair of wall portions with the pairs of wall portions extending from said apexes to form angles greater than 180 degrees.

7. The anchor apparatus as set forth in claim 1 wherein said channel is an elongated, open ended channel having a varying width which is greatest adjacent the opposed ends of said channel and smallest at the location of said apexes.

8. The anchor apparatus as set forth in claim 1 wherein said channel is an elongated, open ended channel having a varying width which is greatest adjacent the opposed ends of said sidewalls and smallest at a location intermediate the opposed ends of said sidewalls.

* * * * *